H. EPPING.
Cylinder Lining for Pumps.
No. 221,223.       Patented Nov. 4, 1879.
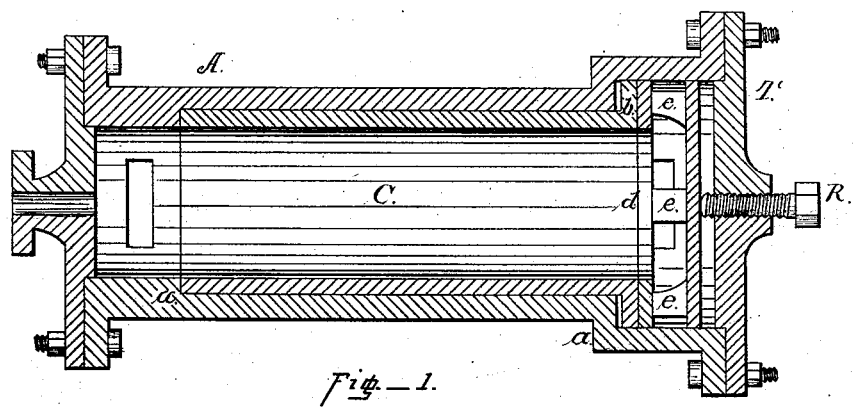
Fig. 1.
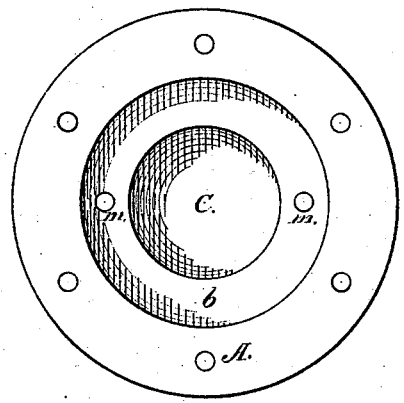   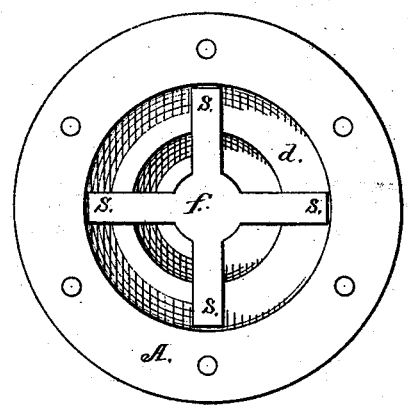
Fig. 2.       Fig. 3.
WITNESSES:                    INVENTOR
Chas. H. Bickell              Henry Epping
Josiah B. Poor                Josiah W. Ell ATTORNEY

UNITED STATES PATENT OFFICE.

HENRY EPPING, OF PITTSBURG, PENNSYLVANIA, ASSIGNOR TO HIMSELF, JOHN D. THOMPSON, AND WM. H. CARPENTER, OF SAME PLACE.

IMPROVEMENT IN CYLINDER-LININGS FOR PUMPS.

Specification forming part of Letters Patent No. 221,223, dated November 4, 1879; application filed March 21, 1879.

*To all whom it may concern:*

Be it known that I, HENRY EPPING, of Pittsburg, in the county of Allegheny and State of Pennsylvania, have invented an Improvement in Cylinder-Linings, of which the following is a specification.

The nature of my invention will be readily understood from the following description, taken in connection with the accompanying drawings, wherein—

Figure 1 represents a central longitudinal section of a pump-cylinder embodying the features of my invention; Fig. 3, an end view of the cylinder with its cap or head displaced, showing a cross-barred cage resting upon the flanged end of the lining. Fig. 2 represents a similar view of the cylinder on the removal of the cage.

My invention consists of an adjustable, reversible, and removable bushing or lining applied to the interior or operative parts of pump-cylinders, and held in position by the means hereinafter described.

The cylinder of the pump to which my invention is applicable may be constructed in any of the well-known forms, and with all the appliances and appendages incident to such contrivances; but in order to fit such cylinders with a lining that may be easily inserted or removed, or, when necessary, so turned on its axis as to vary its bearing with respect to the piston, and thereby cause it to wear more even, is the object of my invention.

The cylinder A is constructed interiorly so as to constitute three divisions, each of a different diameter, forming within the cylinder a shoulder, $a$, near each end, that, after being bored true, is ready to receive the lining or bushing, which consists of an open tube, C, of brass or other suitable metal, provided at one end with an outside flange, $b$, and otherwise so constructed that when placed in the cylinder its end most remote from the flange will abut against that shoulder $a$ having the smallest diameter, and its flange against the other or largest shoulder, near the opposite end of the cylinder, or upon an intervening gasket, by which the joint will be made more effectually air and water tight.

To hold and firmly secure the lining or bushing in place and prevent end-play, an annular plate, $d$, corresponding in size to the flange on the lining, is placed thereupon, which plate is surmounted by a cross-frame, $f$, consisting of four radial bars, $s\ s\ s\ s$, each provided at or near its extremity with a short bracket, $e$, that connects them with the said plate $d$.

The several parts having been properly arranged within the cylinder and its head T securely bolted on, a screw, R, in the center of the head may be brought to bear upon the cross-frame or cage $f$ with a force equal to the requirements of the case, so that any accidental looseness or end-play that may occur in the lining can instantly be counteracted or corrected by simply turning said screw, and that without removal of or change in any of the parts or stoppage of the pump.

Should the lining become unduly worn at any particular part that a change of position would remedy, the cylinder-head T is to be taken off, the cross-frame $f$ or cage removed, and short stout bolts temporarily screwed into the holes $m\ m$ in the flange of the lining, whereby a connection or hold is afforded for starting, and, if necessary, withdrawing the bushing, or so turning it on its axis as to bring about the desired change in the old lining or the substitution of a new one, after which the several parts are to be put together in the manner hereinbefore stated, ready for subsequent operation. This mode of securing the lining is such as will admit of its being turned on its axis and secured at any point within the range of its circumference. In this respect it differs materially from others in use, as in them the turning of the lining is limited to some fixed or determinate point.

Having thus briefly described my invention, I claim—

The cylinder A and lining C, in combination with the cross-bars or cage $f$ and central screw, R, in the cylinder-head T.

HENRY EPPING.

Witnesses:
JOSIAH W. ELLS,
EDWARD ARMSTRONG.